US011799362B2

(12) United States Patent
Devreese et al.

(10) Patent No.: US 11,799,362 B2
(45) Date of Patent: Oct. 24, 2023

(54) METHODS AND SYSTEMS FOR OIL COOLED ROTOR LAMINATIONS

(71) Applicant: Dana Automotive Systems Group, LLC, Maumee, OH (US)

(72) Inventors: Thibault Devreese, Ghent (BE); Steven Vanhee, Hooglede (BE); Joachim Druant, Houthulst (BE)

(73) Assignee: Dana Automotive Systems Group, LLC, Maumee, OH (US)

( * ) Notice: Subject to any disclaimer, the term of this patent is extended or adjusted under 35 U.S.C. 154(b) by 99 days.

(21) Appl. No.: 17/448,190

(22) Filed: Sep. 20, 2021

(65) Prior Publication Data

US 2023/0092822 A1    Mar. 23, 2023

(51) Int. Cl.
*H02K 9/19* (2006.01)
*B60K 11/02* (2006.01)
*H02K 9/193* (2006.01)

(52) U.S. Cl.
CPC .............. *H02K 9/193* (2013.01); *B60K 11/02* (2013.01); *H02K 2209/00* (2013.01)

(58) Field of Classification Search
CPC ...... H02K 9/193; H02K 2209/00; H02K 9/19; B60K 11/02
See application file for complete search history.

(56) References Cited

U.S. PATENT DOCUMENTS

| 5,111,090 | A | 5/1992 | Otake et al. |
| 7,508,100 | B2 | 3/2009 | Foster |
| 7,816,824 | B2 | 10/2010 | Jöckel |
| 8,169,110 | B2 | 5/2012 | Swales et al. |
| 8,536,756 | B2 | 9/2013 | Watanabe et al. |
| 9,148,041 | B2 | 9/2015 | Knoblauch |
| 10,177,631 | B1 | 1/2019 | Hopkins et al. |
| 2009/0121562 | A1 | 5/2009 | Yim |
| 2017/0244294 | A1 | 8/2017 | Holzmueller |
| 2018/0205294 | A1* | 7/2018 | Manabe ............... H02K 9/19 |
| 2019/0027987 | A1 | 1/2019 | Fröhlich et al. |

FOREIGN PATENT DOCUMENTS

| JP | 2012105457 A | 5/2012 |
| JP | 2012105487 A | 5/2012 |
| JP | 2014060857 A | 4/2014 |

OTHER PUBLICATIONS

Jackson, S. et al., "Methods and Systems for Oil Cooled Rotor Laminations," U.S. Appl. No. 16/870,656, filed May 8, 2020, 31 pages.

* cited by examiner

*Primary Examiner* — Jacob M Amick
(74) *Attorney, Agent, or Firm* — McCoy Russell LLP

(57) ABSTRACT

Various methods and systems are provided for a system for cooling an electric motor. The cooling system includes a primary coolant passage through a rotor shaft linked to a plurality of secondary passages though lamination stacks of a rotor configured to receive coolant at a central region of the lamination stacks.

20 Claims, 4 Drawing Sheets

METHODS AND SYSTEMS FOR OIL COOLED ROTOR LAMINATIONS

TECHNICAL FIELD

The present description relates generally to methods and systems for cooling an electric motor, more specifically to cooling laminations of a rotor and end windings of a stator of the electric motor.

BACKGROUND AND SUMMARY

The inventors herein have recognized that in order to achieve the desired levels of performance and reliability in an electric or hybrid vehicle, it is desired that the temperature of an electric motor powering the vehicle is maintained within a specified operating range regardless of ambient conditions or the driving conditions of the vehicle. Increased cooling is desired in the electric motor to ensure a high continuous torque curve. Excessive heating of magnets in a rotor of the motor may lead to reduced performance, demagnetization, and shortened lifespan caused by wear.

As one example, the rotor may be cooled via a passive (or active) airflow which may also cool windings of a stator of the electric motor. However, due to heat generated at the rotor and the stator, the air temperature may exceed 100° C. which may limit the possibility of further heat extraction and cooling. As another example, water may be used to cool the rotor. However, due to high contact resistance between lamination stacks of the rotor and the rotor shaft, cooling performance of water may be reduced. Also, water may not be used to cool the rotor laminations due to its conducting nature.

As noted, the above issues are recognized by the inventors herein.

The inventors have thus recognize that a robust cooling system is desired for the electric motor that would provide sufficient cooling for improved output range of the motor. In one embodiment, a cooling system for an electric motor, comprises: a primary coolant passage through a rotor shaft linked to a plurality of secondary passages though lamination stacks of a rotor configured to receive coolant at a central region of the lamination stacks. In this way, a closed-looped coolant pathway is formed between a pump, a rotor shaft, rotor lamination stacks, balancing plates, and stator end windings.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

The present disclosure will be better understood from reading the following description of non-limiting embodiments, with reference to the attached drawings, wherein below.

DETAILED DESCRIPTION

Figure 1:
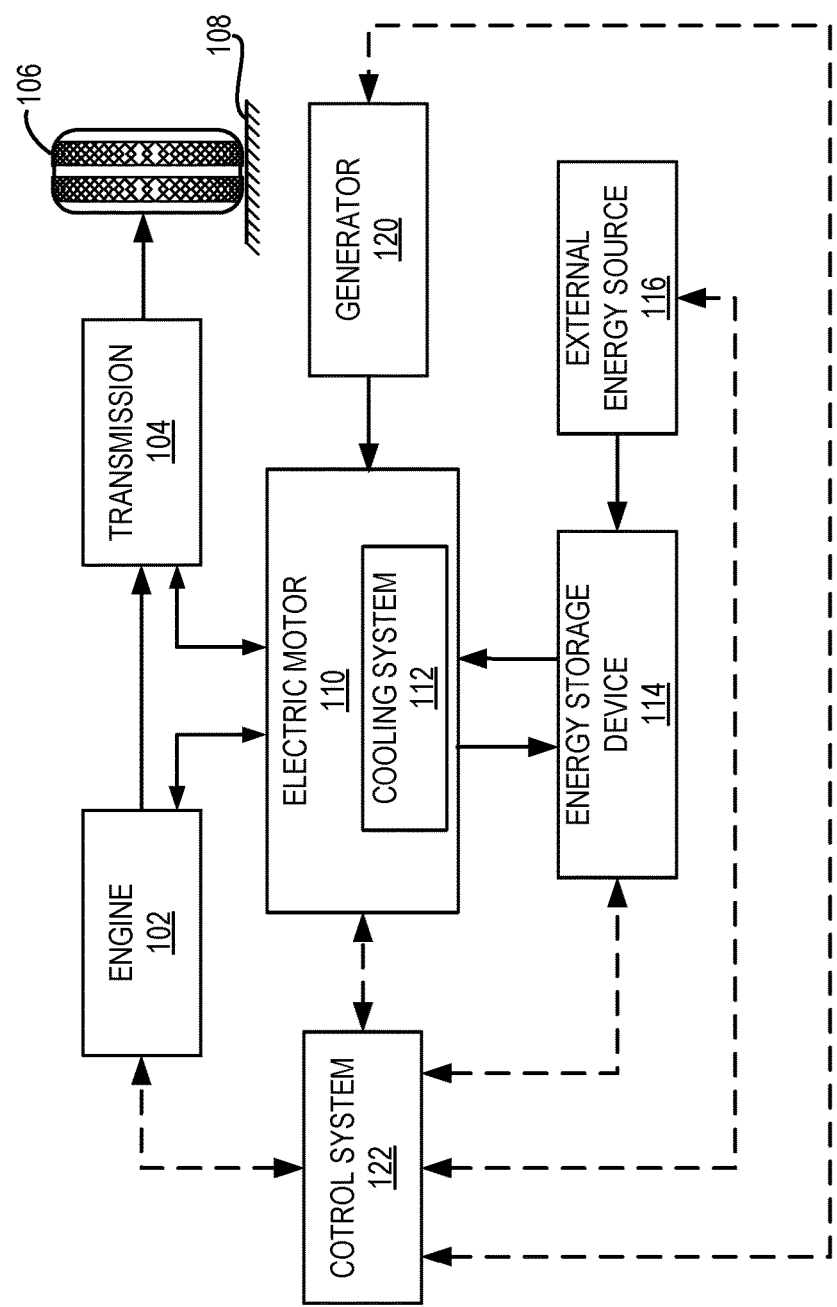
FIG. 1 schematically shows a vehicle with a hybrid propulsion system.

Electric motors generate heat as a result of electrical, magnetic, and mechanical losses, with excessive heat production often leading to motor performance issues (e.g., decreased torque production, control, efficiency) and enhanced component degradation. In electric motors used in vehicles, losses tend to be high during motor starting or dynamic braking events. Thus, thermal management for electric motors is important as the automotive industry continues to transition to more electrically dominant vehicle propulsion systems. In vehicles, the sizing of the motor depends directly on the how the motor is cooled. As such, with the push to reduce component size, lower costs, and reduce weight without sacrificing performance or reliability, the challenges associated with thermal management for electric motors increase. For example, the motor's ability to increase running time at higher power levels within electrical operating limits is directly related to the ability to remove heat from certain components of the motor. As thermal management improves, there will be a direct tradeoff among motor performance, efficiency, cost, and the sizing of electric motors to operate within the thermal constraints.

The heat generated by the electric motor is distributed throughout multiple components within the electric motor. For example, heat may be generated within the stator slot-windings, stator end-windings, stator laminations, rotor laminations, and rotor magnets or conductors. The distribution of the generated heat within the components is dependent on the motor type and the operating condition (torque/speed) of the motor. Thus, the selected cooling approach for the motor impacts the path of heat flow through the motor as well as the temperature distribution amongst the motor components. One current cooling approach involves passive air cooling in which heat generated by the motor may be conducted away from hotter components of the motor to a coupled heat sink (e.g., a mounting surface) and/or fins. Heat may then be transferred from the heat sink and/or fins to the air via convection. However, air cooling systems have been found to be insufficient if the motor has a power output of 15 to 20 kW or more. As such, the additional weight of the fins tends to outweigh the cooling benefits the fins provide. Further, the cooling capacity of air cooling systems may be affected by environmental temperatures. For example, the effectiveness of air cooling systems may be dramatically decreased in hotter climates.

Another current approach involves phase change material based cooling systems in which a phase change material absorbs heat energy from the motor by changing from a solid to a liquid or from a liquid to a gas. While changing phase, the material can absorb large amounts of heat with little change in temperature. Thus, phase change material cooling systems can meet the cooling requirements of the motor, however the volume change that occurs during a phase change restricts its application. Further, the phase change material can only absorb heat generated, not transfer the heat away, thus the phase change material may not reduce overall temperature within the vehicle propulsion system (e.g., the phase change material may only smooth the temperature distribution).

Other current cooling approaches include cooling via a liquid coolant. Liquid coolants have a higher heat conductivity and heat capacity (e.g., ability to store heat in the form of energy in its bonds) than air, and therefore perform more effectively by comparison. Further, liquid coolants offer the advantage of a compact structure as compared to phase change materials. One current liquid cooling system involves squirting or injecting an oil coolant into through-holes within the rotor shaft. Another system involves pumping the oil coolant into a first end of the rotor shaft where the coolant may be spread via centrifugal force as the rotor shaft rotates. However, these systems may lead to non-uniform or unbalanced cooling of the motor. While the cooling capacity of oil coolant may be sufficient to cool the rotor shaft, the flow properties of the oil as well as the contact resistance between the oil and the inner surface of the rotor shaft may limit the effectiveness of these forms of liquid cooling.

As such, there is a demand for an electric motor cooling system that provides uniform and effective temperature control without substantially increasing vehicle weight and manufacturing costs. Thus, according to the embodiments disclosed herein, methods and systems are provided for a system that provides uniform cooling to an electric motor. More specifically, the system cools laminations of a rotor of the electric motor and end windings of a stator using a dielectric fluid, such as oil, passed through a hollow rotor shaft as a coolant. The coolant may flow to the central region of the rotor shaft via a primary passage within the shaft. The primary coolant passage may be linked to a plurality of secondary passages passing though lamination stacks of a rotor via a plurality of corresponding connecting pathways at the central region of the rotor shaft with each secondary passage linked to the primary passage via one corresponding connecting pathway. The plurality of secondary passages may traverse through a length of the lamination stacks from a first end of the lamination stacks to a second end of the lamination stacks. The primary coolant passage may be configured to flow coolant in a single direction from the first end of the rotor shaft to the central region of the rotor shaft, and each of the plurality of secondary passages may be configured to flow a first amount of coolant received from the primary coolant passage in a first direction from the central region of the lamination stacks to the first end of the lamination stacks and a second amount of coolant received from the primary coolant passage in a second direction from the central region of the of the lamination stacks to the second end of the lamination stacks. A first balancing plate may be integrally connected to the first end of the lamination stacks and the first end of the rotor shaft, and a second balancing plate may be integrally connected to the second end of the lamination stacks and the second end of the rotor shaft, the first balancing plate and the second balancing plate including one or more through channels. The through passages in the first balancing plate may be aligned with first ends of the plurality of secondary passages with each through channel of the one or more through channels in the first balancing plate corresponding to one of the plurality of secondary passages, the one or more through channels in the first balancing plate configured to route coolant from the first ends of the secondary passages to end windings of a stator of the electric motor via a nozzle inserted in the through channel in the first balancing plates. The one or more through channels in the second balancing plate may be aligned with second ends of the plurality of secondary passages with each through channel of the one or more through channels in the second balancing plate corresponding to one of the plurality of secondary passages, the one or more through channels in the second balancing plate configured to route coolant from the second ends of the secondary passages to the end windings of the stator of the electric motor via another nozzle inserted in the through channel in the second balancing plates. The coolant may then be routed to a reservoir under gravity or via a pump and then pumped back to the primary passage.

In this way, by routing coolant to a central region of the rotor shaft and the central region of the rotor lamination stacks, the coolant may uniformly flow to each end of the rotor and provide a uniform cooling effect. By bringing the coolant into direct contact with the laminations, the thermal pathway between the rotor laminations and the cooling fluid is greatly reduced thereby aiding cooling performance. The technical effect of including through channels and nozzles in the balancing plates on either ends is that the coolant from the rotor lamination stacks may be sprayed onto the stator end windings via centrifugal forces, thereby also cooling the stator end windings. In this way, a single coolant loop may be used to effectively cool a plurality of components of the electric motor and improve motor performance.

Figure 2:
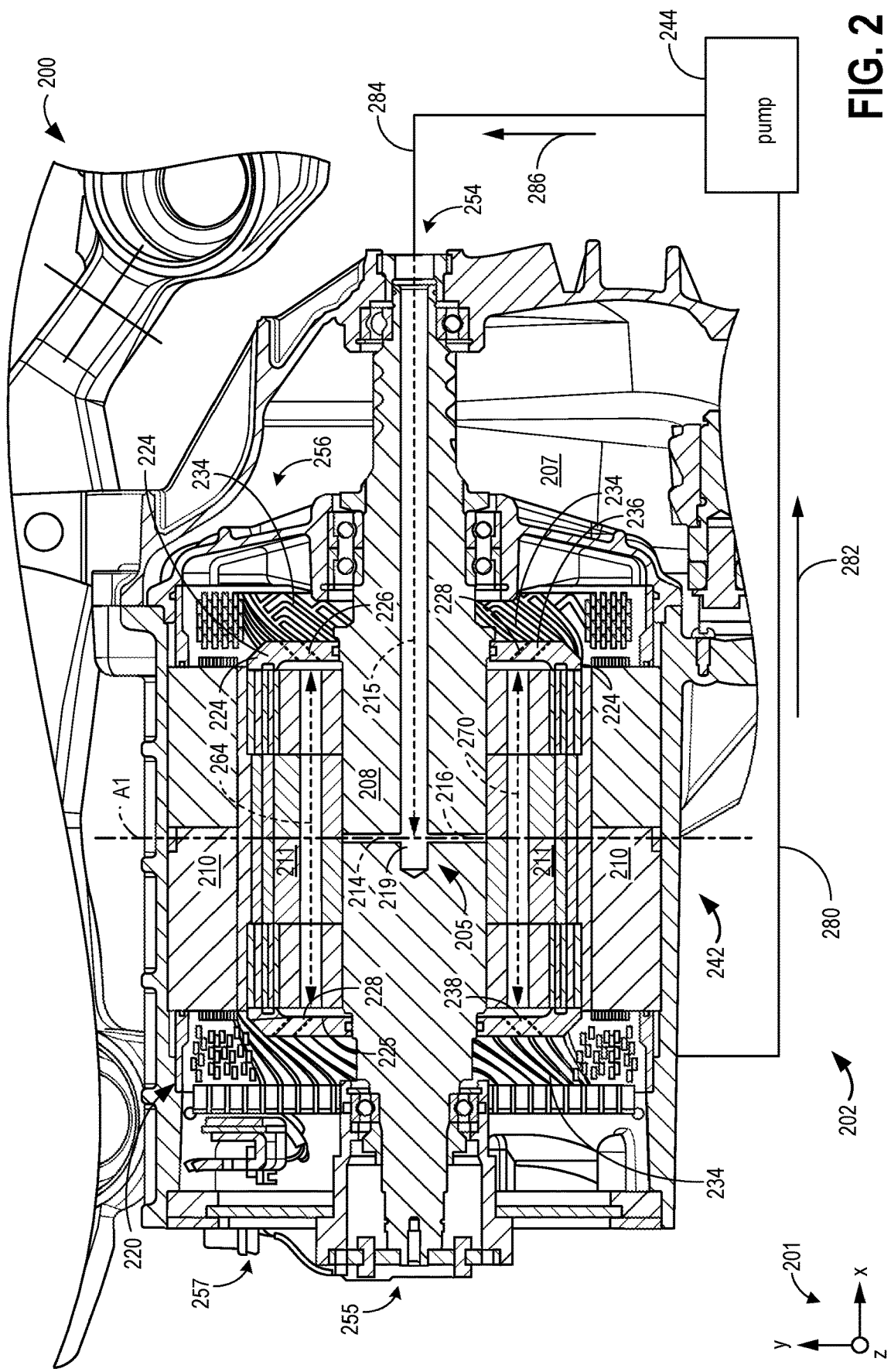
FIG. 2 is a cross-sectional view of a non-limiting example of a cooling system of an electric motor in accordance with the present disclosure.
Figure 3:
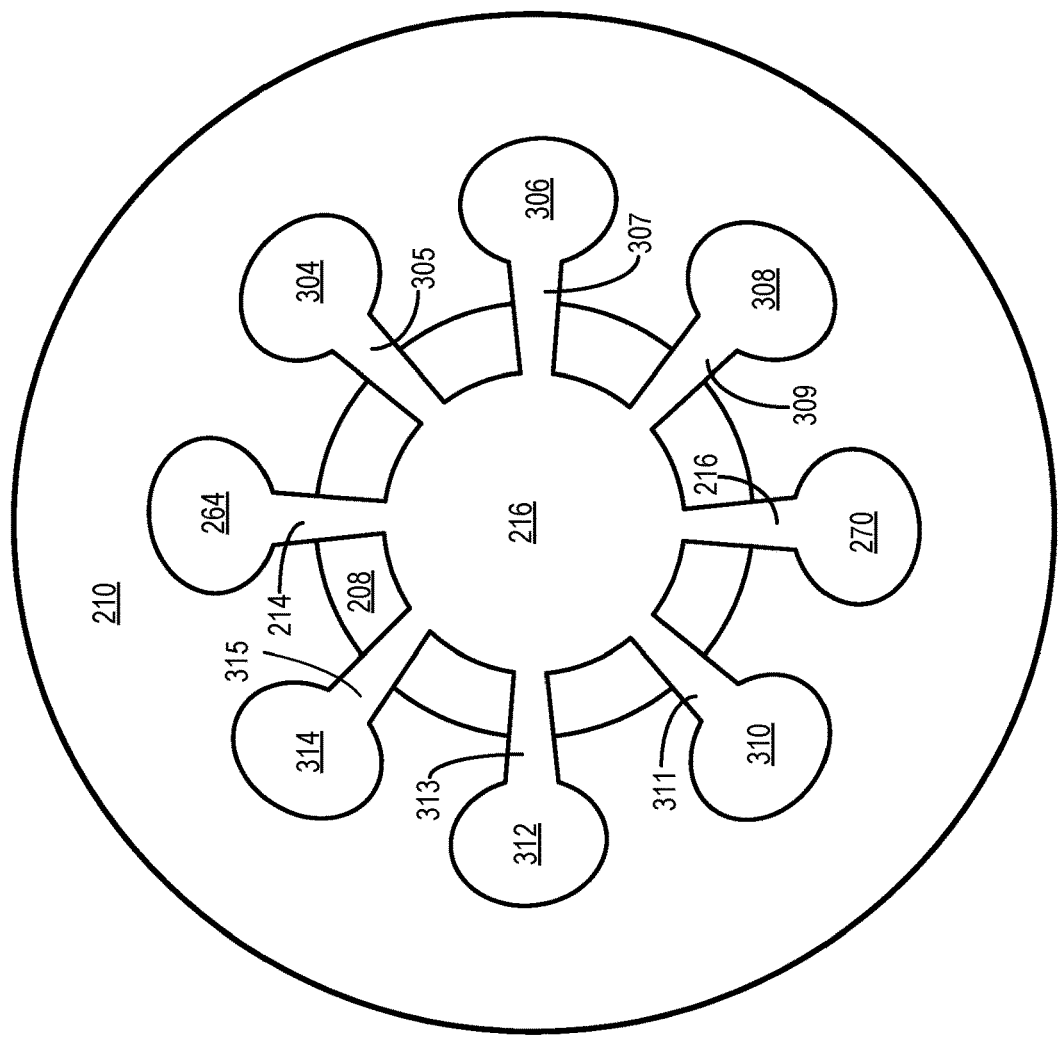
FIG. 3 is a cross-sectional view of a rotor shaft of the electric motor of FIG. 2.
Figure 4:
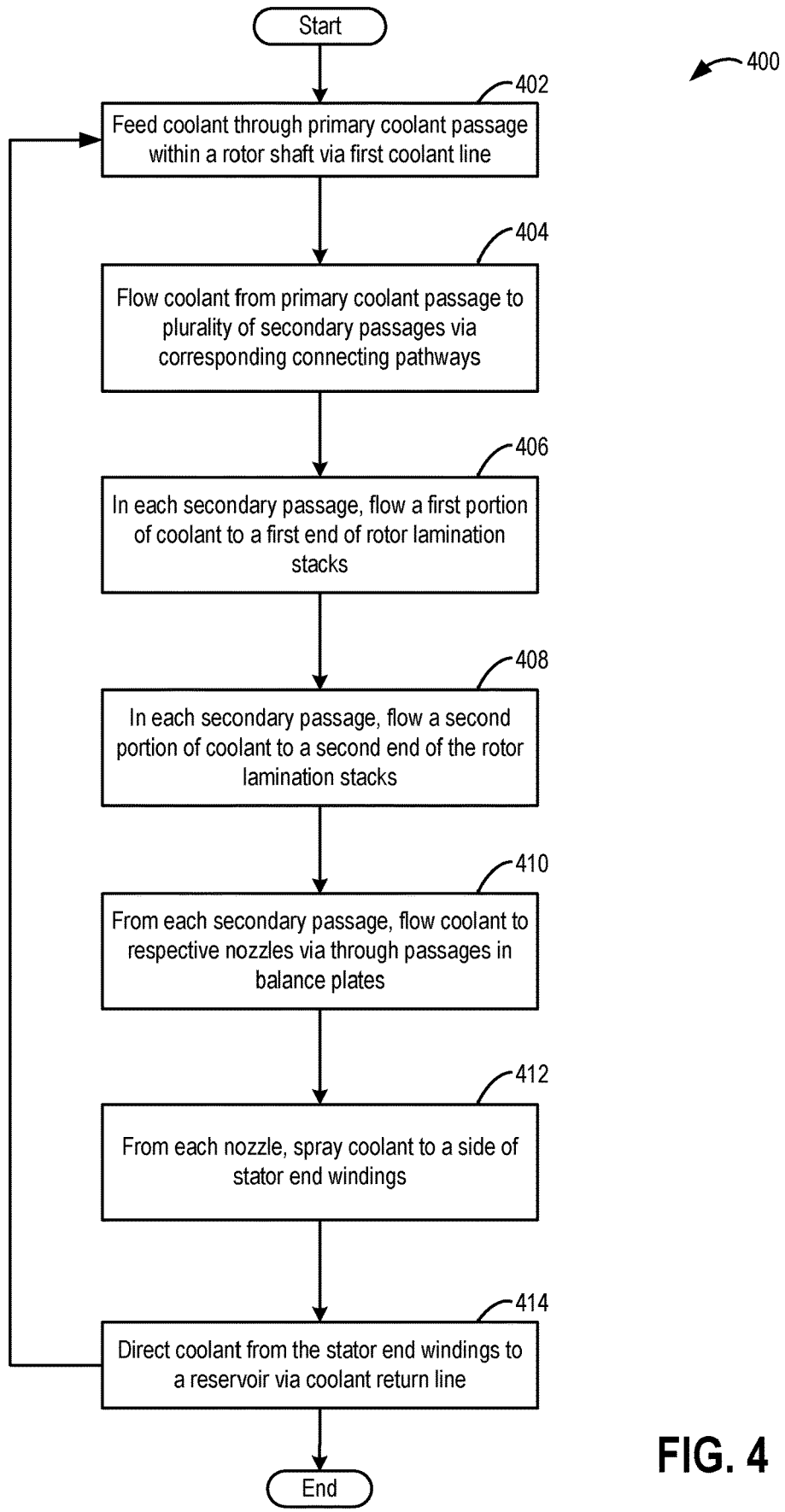
FIG. 4 is a method for cooling the electric motor according to the embodiments of the present disclosure.

FIG. 1 is an example of a hybrid propulsion system for a vehicle that includes an electric motor. FIG. 2 illustrates a cross-sectional view of a non-limiting example of a cooling system, according to the present disclosure, that may be used to cool the electric motor of the propulsion system of FIG. 1. FIG. 2 is shown approximately to scale, however other relative dimensions may be used. Another cross-sectional view of the rotor shaft is shown in FIG. 3. FIG. 4 is a method for cooling laminations of a rotor and end windings of a stator of an electric motor according to the embodiments disclosed herein. A set of reference axes 201 are provided for comparison between views shown, indicating a y-axis, a z-axis, and an x-axis. In some examples, the y-axis may be parallel with a direction of gravity, with the x-axis defining the horizontal plane.

FIG. 1 illustrates an example vehicle propulsion system 100. Vehicle propulsion system 100 includes a fuel burning engine 102 and a motor 110. As a non-limiting example, engine 102 comprises an internal combustion engine and motor 110 comprises an electric motor. Motor 110 may be configured to utilize or consume a different energy source than engine 102. For example, engine 102 may consume a liquid fuel (e.g., gasoline) to produce an engine output while motor 110 may consume electrical energy to produce a motor output. As such, a vehicle with propulsion system 100 may be referred to as a hybrid electric vehicle (HEV).

The engine 102 and motor 110 may be coupled to a transmission 104. The transmission 104 may be a manual transmission, automatic transmission, or combinations thereof. Further, various additional components may be included, such as a torque converter, and/or other gears such as a final drive unit, etc. Transmission 104 is shown coupled to a drive wheel 106 which is in contact with a road surface 108. Thus, the electric motor 110 may be drivingly coupled to the engine 102 and the drive wheel 106 via transmission 104. The depicted connections between the engine 102, motor 110, transmission 104, and drive wheel 106 indicate transmission of mechanical energy from one component to another, whereas the connections between the motor 110 and an energy storage device 114 may indicate the transmission of electrical energy forms.

Vehicle propulsion system 100 may utilize a variety of different operational modes depending on operating conditions encountered by the vehicle propulsion system 100. Some of these modes may enable engine 102 to be maintained in an off state (e.g., set to a deactivated state) where combustion of fuel at the engine is discontinued. For example, under select operating conditions, motor 110 may propel the vehicle via the drive wheel 106 while engine 102 is deactivated. During other operating conditions, engine 102 may be set to a deactivated state (as described above) while motor 110 may be operated to charge an energy storage device 114 (e.g., a battery, capacitor, flywheel, pressure vessel, so on). For example, motor 110 may receive wheel torque from the drive wheel 106 where the motor 110 may convert the kinetic energy of the vehicle to electrical energy for storage at the energy storage device 114. This operation may be referred to as regenerative braking of the vehicle. Thus, motor 110 can provide a generator function in some embodiments. However, in other embodiments, a generator 120 may instead receive wheel torque from the drive wheel 106, where the generator 120 may convert the kinetic energy of the vehicle to electrical energy for storage at the energy storage device 114.

During still other operating conditions, engine 102 may be operated by combusting fuel (e.g., gasoline, diesel, alcohol fuels, fuel blends) received from a fuel system. For example, engine 102 may be operated to propel the vehicle via the drive wheel 106 while motor 110 is deactivated. During other operating conditions, both engine 102 and motor 110 may each be operated to propel the vehicle via the drive wheel 106. A configuration where both the engine 102 and the motor 110 may selectively propel the vehicle may be referred to as a parallel type vehicle propulsion system. Note that in some embodiments, motor 110 may propel the vehicle via a first set of drive wheels and engine 102 may propel the vehicle via a second set of drive wheels.

In other embodiments, the vehicle propulsion system 100 may be configured as a series type vehicle propulsion system, whereby the engine 102 does not directly propel the drive wheel 106. Rather, engine 102 may be operated to power the motor 110, which may in turn propel the vehicle via drive wheel 106. For example, during select operating conditions, the engine 102 may drive the generator 120 which may, in turn, supply electrical energy to one or more of the motor 110 or energy storage device 114. As another example, the engine 102 may be operated to drive motor 110 which may, in turn, provide a generator function to convert the engine output to electrical energy, where the electrical energy may be stored at the energy storage device 114 for later use by the motor 110.

In some embodiments, the energy storage device 114 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 114 may include one or more batteries and/or capacitors.

A control system 122 may communicate with one or more of the engine 102, motor 110, energy storage device 114, generator 120 and/or additional components of the vehicle propulsion system 100. For example, the control system 122 may receive sensory feedback information from one or more of the engine 102, motor 110, energy storage device 114, and generator 120. Further, control system 122 may send control signals to one or more of the engine 102, motor 110, energy storage device 114, and generator 120 responsive to this sensory feedback. Control system 122 may receive an indication of an operator requested output of the vehicle propulsion system from a vehicle operator (e.g., via a pedal position sensor communicatively coupled to an acceleration and/or brake pedal).

Energy storage device 114 may periodically receive electrical energy from an external energy source 116 residing external to the vehicle (e.g., not part of the vehicle). As a non-limiting example, the vehicle propulsion system 100 may be configured as a plug-in hybrid electric vehicle (PHEV), whereby electrical energy may be supplied to the energy storage device 114 from the external energy source 116 via an electrical energy transmission cable. While the vehicle propulsion system 100 is operated to propel the vehicle, the external energy source 116 may be disconnected from the energy storage device 114. The control system 122 may identify and/or control the amount of electrical energy stored at the energy storage device, which may be referred to as the state of charge (SOC). In other embodiments, electrical energy may be received wirelessly at the energy storage device 114 from the external energy source 116. For example, energy storage device 114 may receive electrical energy from the external energy source 116 via one or more of electromagnetic induction, radio waves, and electromagnetic resonance. As such, it should be appreciated that any suitable approach may be used for recharging the energy storage device 114 from a power source that does not comprise part of the vehicle. In this way, the motor 110 may propel the vehicle by utilizing an energy source other than the fuel utilized by the engine 102.

Thus, it should be understood that the exemplary vehicle propulsion system 100 is capable of various modes of operation. In a full hybrid implementation, for example, the vehicle propulsion system 100 may operate using the motor 110 as the only torque source propelling the vehicle. This "electric only" mode of operation may be employed during braking, low speeds, while stopped at traffic lights, etc. Further, the motor 110 includes a cooling system 112 as heat may be generated as a chief by-product when the motor 110 is in use. While a hybrid implementation of the cooling system 112 is shown, the cooling system 112 for the motor 110 could also be provided in a fully electric vehicle or another suitable electric motor.

The cooling system 112 may include a primary passage passing through a central axis of a rotor shaft of the motor from a first end of a rotor to a central region of the rotor, and two or more secondary passages passing through the lamination stacks of the rotor, each secondary passage configured to receive coolant flowing through the primary passage and flowing the coolant to two opposite ends of the lamination stacks and the end windings of a stator. Each secondary passage may be configured to receive coolant flowing through the primary passage via a distinct connecting pathway, the two or more secondary passages parallel to each other. A first end of each secondary passage may be aligned to a through channel on a first balancing plate coupled to the lamination stacks at a first end, and a second end of each secondary passage may be aligned to another through channel on a second balancing plate coupled to the lamination stacks at a second end, each of the through channel and the another through channel configured to supply coolant from each secondary passage to the end windings of the stator via respective nozzles. A pump may extract coolant from the end windings of the stator to a reservoir and another pump may recirculate the coolant to the primary passage. Details of the cooling system 112 is described in FIGS. 2-3.

FIG. 2 is a cross-sectional view 200 of a non-limiting example of a cooling system 202 for an electric motor (e.g., electric motor 110 of FIG. 1). The cooling system 202 may include a coolant reservoir (e.g., a transmission oil reservoir), a coolant pump (e.g., a transmission oil pump 244, as further described below), and a plurality of interconnected passages within the electric motor.

A variety of suitable electric motor configurations may be used depending on the end-use design goals. For example, the motor 110 may be an alternating current (AC) motor or a direct current (DC) motor. AC motor types include asynchronous (e.g., squirrel cage and wound rotor) and synchronous style motors. Synchronous motors, such as multiphase motors, may be used in certain embodiments. The styles of multiphase motors that may be deployed include permanent magnet, synchronous reluctance, hybrid synchronous (e.g., permanent magnet assisted synchronous reluctance), synchronous induction, and hysteresis. Continuing with the AC motor use-case, a synchronous permanent magnet motor may be utilized, in some instances, due to its relatively high conversion efficiency.

The electric motor includes a housing 207 that encloses internal components. A stator 220 including end windings 234 may be enclosed via the housing 207. The end winding 234 may include a plurality of wound or hairpin wires (e.g., round wires, rectangular wires, flat wires, etc.) which are outside a core of the stator 220. However, it will be appreciated that the stator core also includes wire sections which extend therethrough. Further, the stator 220 may receive electrical energy from an energy storage device (e.g., battery, capacitor, and the like) and in some cases, such as when the motor is designed with regeneration functionality, transfer electrical energy to the energy storage device.

The electric motor further includes a rotor 242 with a rotor shaft 208 rotating about a central axis of the rotor 242. The rotor shaft 208 may be comprised of a suitable material (e.g., aluminum, SAE 1045 in cold or hot rolled steel, C1045). The rotor shaft 208 may have a columnar shape with a circular cross-section (e.g., along the z-axis) and be rotatably supported about its own axis by an output-end bearing and encoder-end bearing provided between both ends thereof and the housing 207.

The rotor core may include a plurality of lamination stacks 211 (e.g., laminated magnetic steel or iron) or a solid magnetic metal. Thus, the rotor core includes a magnetically interactive portion (e.g., permanent magnet or electromagnet). The lamination stacks 211 may be a package of individual electromagnetic plates separated by electrically insulating layers to suppress eddy current losses under magnetic loading. For example, the lamination stacks 211 may be comprised of a number of disk shaped steel plates laminated in silicone. The plates comprising the lamination stacks 211 may be stacked loosely together, welded together (e.g., plasma welded, laser welded, TIG-resistance welded), or otherwise suitably bonded (e.g., via interlocking, bonding varnish). The lamination stacks 211 may be tube shaped and surround a portion of the rotor shaft 208 so that two ends of the rotor shaft 208 are located outside of the lamination stacks 211. Stator lamination stacks 210 surround the rotor lamination stacks 210. It will be appreciated that during motor operation, the rotor 242 may rotate while the stator 220 is held relatively stationary.

The stator 220 and the rotor 242 are configured to electromagnetically interact to generate a rotational output and, in some cases, generate electrical energy responsive to receiving a rotational input from an external source such as a vehicle gear-train, in one use-case example. However, as mentioned above, the motor may be used in wide variety of operating environments. As such, the electric motor is configured to generate rotational output and, in some examples, in a regeneration mode, receive rotational input and generate electrical energy output. Thus, the electric motor may be designed to receive electrical energy from the energy storage device and, in some examples, transfer energy to the energy storage device. Wired and/or wireless energy transfer mechanisms may be used to facilitate this energy transfer functionality.

A first balancing plate 224 is shown attached to the lamination stacks 211 at a first end 256. A second balancing plate 225 is shown attached to the lamination stacks 211 at a second end 257. The first balancing plate 224 and the second balancing plate 225 may be designed to account for imbalances in the rotor 242. To elaborate, the mass and mass distribution of the first balancing plate 224 may be selected to counterbalance residual unbalanced forces in the motor. In other words, the balancing plate may provide substantial counterbalance functionality, in one example.

The electric motor may be coupled to a control system (such as control system 122 in FIG. 1) with a controller (not shown). The controller may include a processor (e.g., a microprocessor unit and/or other types of circuits) and memory (e.g., random access memory, read only memory, keep alive memory, combinations thereof, etc.). The controller may be configured to send control commands to system components as well as receive signals from sensors and other suitable components. The controllable components may include the electric motor (e.g., the motor's stator). It will be understood that the controllable components may include actuators to enable component adjustment. As such, the controller may receive a signal indicative of the motor's speed and adjust the output of the motor based on the speed signal. Other controllable components in the electric motor may function in a similar manner. Furthermore, it will be understood that the controller may send and receive signals via wired and/or wireless communication.

The housing 207 may further enclose additional components of the electric motor such as a plurality of magnets, an electromagnetic coil wound around protrusions of a stator, and/or a rotational sensor (not shown for brevity).

A first primary passage 215 may be formed within the rotor shaft 208 with a central axis of the first primary passage 215 coinciding with a central axis of rotation of the rotor shaft 208. The first primary passage 215 may extend from the first end 254 of the rotor shaft to a central region 205 of the rotor shaft 208. At the first end 254 of the rotor shaft, the primary passage 215 may be coupled to a coolant pump 244 (such as a transmission oil pump) via a coolant supply line 284.

The primary passage 215 may be linked to a plurality of secondary passages passing though the lamination stacks 211 via a plurality of corresponding connecting pathways at the central region 205 of the rotor shaft with each secondary passage linked to the primary passage via one corresponding connecting pathway. In this cross-sectional view, a first secondary passage 264 and a second secondary passage 270 are shown connected to the primary passage 215 via a first connecting pathway 214 and a second connecting pathway 216, respectively. Openings such as opening 219 lead to other similar connecting pathways. The first connecting pathway 214 and the second connecting pathway 216 may linearly extend to opposite sides of the primary passage 215. Each of the first secondary passage 264 and the second secondary passage 270 may pass through a central region of the lamination stacks extending from the first end 256 of the lamination stacks 211 to the second end 257 of the lamination stacks, the first secondary passage 264 substantially parallel to the second secondary passage 270.

The first balancing plate 224 may include a plurality of through channels which may be aligned with respective ends of secondary passages. As shown in this cross-sectional view, a first through channel 226 may be aligned with a first end of the first secondary passage 264 and a second through channel 228 may be aligned with a second end of the first secondary passage 264. Similarly, a third through channel 236 may be aligned with a first end of the second secondary passage 270 and a fourth through channel 238 may be aligned with a second end of the second secondary passage 270. In another example, the through channels in the balancing plate may not be aligned to the end of the secondary passages. The shape of the balancing plates may create a collector cavity between the balance plates and the lamination stack. The oil flow may be redistributed across the through channels in the balancing plate and the number of through channels may be independent of the number of secondary passages.

Each of the first through channel 226, the second through channel 228, the third through channel 236, and the fourth through channel 238 may be cylindrical passages passing through the respective balancing plates, each of the through channels may include a nozzle (not shown). The nozzles inserted in the through channels in the balancing plates are sized to enable coolant to flow out of the through channels to the end windings of the stator via the respective nozzles. The purpose of the nozzles is the accelerate the oil flow and make an oil jet that sprays towards the end-windings.

In this cross-sectional view, two secondary passages are shown parallel to each other. However, there may be more than two secondary passages surrounding the primary passage 215.

FIG. 3 shows a cross-sectional view 300 of a rotor shaft 208 of the electric motor taken along the A1 axis as shown in FIG. 2, and shows more than two secondary passages surrounding the primary passage. The primary passage 215 may pass through the rotor shaft 208 and may be coaxial with the rotor shaft 208. In this example, eight evenly spaced secondary passages are shown surrounding the primary passage 215 with the arrangement of secondary passages being radially symmetric around the primary passage 215. In other embodiments, any number of secondary passages may be included around the primary passage 215 in any arrangement. Each of the secondary passages may run horizontally (e.g., parallel to the x-axis) through the lamination stacks 211 and surround the primary passage 215. For example, the secondary passages may include: a first secondary passage 264 adjacent to and spaced away from a third secondary passage 304; a fourth secondary passage 306 adjacent to and spaced away the third secondary passage 304, a fifth secondary passage 308; a second secondary passage 270 (as shown in FIG. 2), a sixth secondary passage 310; a seventh secondary passage 312; and an eighth secondary passage 314 around the outer perimeter of the primary passage 215. The channels comprising the plurality of secondary passages may be tubular with a circular, elliptical, or polygonal cross section. Each of the secondary passages may pass through central regions of the lamination stacks 211 of the rotor 208.

Each secondary passage may be fluidically coupled to the primary passage 215 via a corresponding, distinct connecting pathway. For example, the first secondary passage 264 may be coupled to the primary passage 215 via a first connecting pathway 214, the third secondary passage 304 may be coupled to the primary passage 215 via a third connecting pathway 305, the fourth secondary passage 306 may be coupled to the primary passage 215 via a fourth connecting pathway 307, the fifth secondary passage 308 may be coupled to the primary passage 215 via a fifth connecting pathway 309, the second secondary passage 270 may be coupled to the primary passage 215 via a second connecting pathway 216, the sixth secondary passage 310 may be coupled to the primary passage 215 via a sixth connecting pathway 311, the seventh secondary passage 312 may be coupled to the primary passage 215 via a seventh connecting pathway 313, and the eighth secondary passage 314 may be coupled to the primary passage 215 via an eighth connecting pathway 315. Each of the connecting pathways may be evenly spaced and may exit radially out of the primary passage 215.

Returning to FIG. 2, the lamination stacks 211 may have the same axial center as the outer peripheral portion of the rotor shaft 208. The lamination stacks 211 may be connected or suitably coupled to the rotor shaft 208 so that both components are integrally rotated within the motor in response to an input of electrical energy to the motor. For example, the plurality of magnets may be arranged within the housing 207 around the outer peripheral portion of the lamination stacks 211. Thus, as current flowing through the electromagnetic coil is appropriately changed (e.g., via output from a coupled energy storage device such as energy storage device 114 of FIG. 1), the magnetic field generated in the protrusions of the stator will change. In turn, the change in the magnetic field of the stator will cause rotation of the lamination stacks 211 and rotor shaft 208 (e.g., via the plurality of magnets) which may be output as a mechanical driving force for the vehicle.

A return line 280 of the coolant may lead from the end windings 234 of the stator to a reservoir (not shown) which may then be coupled to the pressure pump 244. Coolant may be circulated through the rotor shaft 208, the rotor lamination stacks 211, the balancing plates, and the end windings 234 in a closed loop via the coolant supply line 284 (direction of coolant flow shown by arrow 286) and the return line 280 (direction of coolant flow shown by arrow 282). After flowing through the motor components, the coolant may flow back to the return line 280 due to gravity or via a scavenge pump (not shown). Prior to the coolant being recirculated via the pressure pump 244, heat from the coolant (adsorbed from the motor components) may be dissipated at a heat exchanger (not shown) such as a water to oil heat exchanger. As an example, the coolant may be routed to the primary coolant passage 216 from the reservoir via the pump 244 and the coolant supply line 284. The coolant may flow from the primary coolant passage 216 to a center of each of a plurality of secondary passages via corresponding connecting pathways, and then flow to both ends of lamination stacks 211 via the plurality of secondary passages, and then be routed to nozzles in the through channels within the balancing plates, and then be sprayed to end windings 234 of the stator via the nozzles. As an example, coolant may flow from the primary passage 215 to the first secondary passage 264 via the first connecting pathway 214 and coolant may flow from the primary passage 215 to the second secondary passage 270 via the second connecting pathway 216.

Flowing coolant to both ends of laminations stacks include, for each secondary passage, flowing a first portion of the coolant received from the primary coolant passage to the first balancing plate 224 coupled to the first end of the lamination stacks and flowing a second portion of the coolant received from the primary coolant passage to the second balancing plate 225 coupled to the second end of the lamination stacks. A direction of the flow of the first portion of coolant through a secondary passage (such as 264 or 270) may be opposite to a direction of the flow of the second portion of coolant through the secondary passage (such as 264 or 270). As the coolant flows in opposite directions through the secondary passages (coolant flow shown by dashed arrows) from the center of the secondary passages to each end of the passages, the laminations stacks may be uniformly cooled. By distributing the coolant through the center of the lamination stacks, a higher degree of heat may be extracted from the lamination stacks, thereby improving cooling effects.

The first portion of the coolant from a secondary passage may reach the first balancing plate 224 and the second portion of the coolant from a secondary passage may reach the second balancing plate 225. As previously described, the balancing plates may include through channels aligned with respective ends of the secondary passages via which the coolant may be routed to nozzles and then sprayed onto the end windings of the stator via the nozzles. In this example, the first portion of the coolant flowing through the first secondary passage 264 may be sprayed to the upper portion (along the y axis) of the first end of the end windings 234 (due to centrifugal force) through a first nozzle. Similarly, the second portion of the coolant flowing through the first secondary passage 264 may be sprayed to the upper portion (along the y axis) of the second end of the end windings 234 (due to centrifugal force) through a second nozzle. The first portion of the coolant flowing through the second secondary passage 270 may be sprayed to the lower portion (along the y axis) of the first end of the end windings 234 (due to centrifugal force) through a third nozzle. Similarly, the second portion of the coolant flowing through the second secondary passage 270 may be sprayed to the lower portion (along the y axis) of the second end of the end windings 234 (due to centrifugal force) through a fourth nozzle. In this way, the coolant may be supplied to both balancing plates and to both ends of the stator end windings for effective cooling. From the end windings, the coolant may be routed back to the reservoir via the return line 280. The return to the reservoir may be due to gravity or via a pressure pump 244.

If the cooling system 202 is suitably sized, the system 202 may be self-pumping (e.g., if the outlet of the rotor cooling circuit is radially more outlet to the inlet, centrifugal forces may enforce a coolant flow). In some examples, the system 202 may be driven and/or assisted by an external pump. In some examples, the cooling system 202 may include an oil supply instead of the liquid coolant supply, with oil pumped through the closed-loop pathway to induce cooling of the electric motor (e.g., water glycol solution may be passed through the inner surface of axial holes lined with a dielectric liner).

Thus, the coolant may continually and uniformly flow through rotor and stator windings when the motor is in use. As the coolant is circulated through the motor components, generated heat may be transferred to the coolant thereby cooling the motor. Further, by passing the coolant through the plurality of axial secondary channels, overall resistance between the coolant and the lamination stacks 211 may be reduced thereby increasing the effectiveness of cooling provided by the coolant. Thus, uniform cooling may be provided by the cooling system 202 without adding excessive weight to the motor. In some embodiments, the inner surface of plurality of secondary channels may be lined with a liner (e.g., a dielectric liner) so that another type of liquid coolant (e.g., water) may be employed by the cooling system 202. In some embodiments, a passive catch system rather than the coolant pump 244 may be used to maintain the continuous flow of the coolant through the motor.

In this way, the systems in FIGS. 1-3 provide for a rotor shaft radially enclosed within lamination stacks of a rotor, a stator including end windings at each end enclosing the lamination stacks of a rotor, a primary passage passing through a central axis of the rotor shaft from a first end of the rotor to a central region of the rotor, and two or more secondary passages passing through the lamination stacks of the rotor, each secondary passage configured to receive coolant flowing through the primary passage and flowing the coolant to two opposite ends of the lamination stacks and the end windings of the stator. A first pump may be configured to extract coolant from the end windings of the stator to a reservoir, and a second pump may be configured to recirculating the coolant to the primary passage.

FIG. 4 is a flowchart illustrating a method 400 for cooling components of an electric motor according to the embodiments of the present disclosure. Method 400 is described with respect to the system and components described above with respect to FIGS. 1-3 but could also be carried out with other systems/components (e.g., an electric motor of an electric vehicle, electric motors of machines) without departing from the scope of this disclosure. Method 400 may be carried out according to instructions stored in non-transitory memory of a computing device such as a central processing unit (CPU) or control system (e.g., control system 122 of FIG. 1) of a vehicle.

At 402, method 400 may include feeding coolant through a primary coolant passage (such as primary passage 215 in FIG. 2) within a rotating rotor shaft via a first coolant line (such as coolant supply line 284 in FIG. 2). The coolant may be pumped from a reservoir to a first end of the rotor shaft where the coolant may enter the primary coolant passage and flow through the passage to the central region of the rotor shaft. As the coolant flows through the primary passage, heat from the rotor shaft may be dissipated to the coolant.

Upon reaching the central region of the rotor shaft via the primary coolant passage, at 404, the coolant may flow from the primary coolant passage to a plurality of secondary coolant passages (such as secondary passages 264 and 270 in FIG. 2) via corresponding connecting pathways (such as pathways 214 and 216 in FIG. 2). Each connecting pathway fluidically couples a central region of a corresponding secondary passage to the primary passage. Therefore, the coolant from the primary passage may be substantially (such as within 5% variation) evenly distributed among the plurality of the secondary passages and the coolant from the primary passage may reach the central region of each secondary passage. In this way, if there are eight secondary passages, the coolant flowing through the primary passage may be substantially equally divided into eight parts with each part flowing to one secondary passage.

Upon reaching each secondary passage, at 406, a first portion of the coolant reaching that secondary passage flows to a first end of the rotor lamination stacks while, at 408, a second (remaining) portion of the coolant reaching that secondary passage flows to a second, opposite end of the rotor lamination stacks. As the coolant flows simultaneously, axially though the plurality of secondary passages passing through the laminations stacks, heat generated at the lamination stacks may be transferred to the coolant. In each secondary passage, the first portion of the coolant flows in a first direction from the central region of the secondary passage to the first end while the second portion of the coolant flows in a second, opposite direction from the central region of the secondary passage to the second end.

At 410, from each end of each of the secondary passages, the coolant may flow to respective nozzles coupled to through passages within balancing plates. The balance places may act as a collector and can redistribute the oil flow over the nozzles in the balance plates. The first portion of coolant may flow through a through channel in the first balancing plate (such as first balancing plate 224 in FIG. 2) and reach a nozzle. The second portion of the coolant may flow through a through channel in the second balancing plate (such as second balancing plate 225 in FIG. 2) and reach another nozzle.

At 412, from each secondary passage, coolant may be sprayed to a side of the stator end windings via the nozzles. The first portion of the coolant may be sprayed onto a first side of stator end windings via a nozzle coupled to the balance plate. The second portion of the coolant may be sprayed onto a second side of stator end windings via another nozzle coupled to the balance plate. The nozzles may be configured (such as shaped and sized) to enable coolant flowing through the secondary passage and the balancing plates to be sprayed onto the stator end windings due to centrifugal force. As the coolant flows through the balancing plates and onto the stator end windings, heat may be dissipated from the balancing plates and each side of stator end winding to the coolant. One or more secondary passages may deliver coolant to the first side and the second side of stator end windings via corresponding nozzles.

At 414, the coolant sprayed onto the first side and the second side of the stator end windings may be directed to the reservoir via a return line (such as return line 280 in FIG. 2). A scavenge pump may be used to direct the coolant from the stator to the reservoir. A separate, pressure pump may be used for routing coolant from the reservoir to the primary passage. Prior to recirculation of the coolant to the primary passage, heat adsorbed by the coolant may be dissipated at a heat exchanger.

In this way, coolant may be effectively routed through a central region of lamination stacks of a rotor via a plurality of evenly distributed secondary passages, thereby attaining improved cooling of the rotor. By flowing the coolant to the stator end windings, further cooling of the stator may also be attained via a single coolant loop. By bringing the coolant (e.g., oil) into direct contact with the surface of the rotor laminations, contact area may be increased, thereby reducing overall thermal resistance and uniformly cooling the rotor.

An example cooling system for an electric motor comprises: a primary coolant passage through a rotor shaft linked to a plurality of secondary passages though lamination stacks of a rotor configured to receive coolant at a central region of the lamination stacks. In the preceding example, additionally or optionally, the primary coolant passage is linked to the plurality of secondary passages via a plurality of corresponding connecting pathways at a central region of the rotor shaft with each secondary passage linked to the primary passage via one corresponding connecting pathway. In any or all of the preceding examples, additionally or optionally, the primary coolant passage runs along a central axis of the rotor shaft from a first end of the rotor shaft to the central region of the rotor shaft where the primary coolant passage is linked to the plurality of secondary passages, the central region substantially equidistance from the first end and a second end of the rotor shaft. In any or all of the preceding examples, additionally or optionally, the plurality of secondary passages are arranged radially symmetrically around a central axis of the primary passage and linked to the primary passage via corresponding connecting pathways. In any or all of the preceding examples, additionally or optionally, the plurality of secondary passages traverse through a length of the lamination stacks from a first end of the lamination stacks to a second end of the lamination stacks. In any or all of the preceding examples, additionally or optionally, the primary coolant passage is configured to flow coolant in a single direction from the first end of the rotor shaft to the central region of the rotor shaft, and wherein each of the plurality of secondary passages is configured to flow a first amount of coolant received from the primary coolant passage in a first direction from the central region of the of the lamination stacks to the first end of the lamination stacks and a second amount of coolant received from the primary coolant passage in a second direction from the central region of the of the lamination stacks to the second end of the lamination stacks. Any or all of the preceding examples, further comprising, additionally or optionally, a first balancing plate integrally connected to the first end of the lamination stack and the first end of the rotor shaft, and a second balancing plate integrally connected to the second end of the lamination stack and the second end of the rotor shaft, the first balancing plate and the second balancing plate including one or more through channels. In any or all of the preceding examples, additionally or optionally, the through passages in the first balancing plate is aligned with first ends of the plurality of secondary passages with each through channel of the one or more through channels in the first balancing plate corresponding to one of the plurality of secondary passages, the one or more through channels in the first balancing plate configured to route coolant from the first ends of the secondary passages to end windings of a stator of the electric motor via a nozzle coupled to the first balancing plate. In any or all of the preceding examples, additionally or optionally, the one or more through channels in the second balancing plate is aligned with second ends of the plurality of secondary passages with each through channel of the one or more through channels in the second balancing plate corresponding to one of the plurality of secondary passages, the one or more through channels in the second balancing plate configured to route coolant from the second ends of the secondary passages to end windings of the stator of the electric motor via another nozzle coupled to the second balancing plate. In any or all of the preceding examples, additionally or optionally, the primary coolant passage is configured to receive coolant from a reservoir via a coolant pump, the system further comprising a scavenge pump configured to return the coolant from the end windings of the stator to the reservoir for recirculation to the primary coolant passage.

Another example method for a cooling system of an electric motor comprises: flowing coolant from a primary coolant passage to a center of each of a plurality of secondary passages via corresponding connecting pathways, flowing coolant to both ends of lamination stacks of a rotor via the plurality of secondary passages, and routing coolant to end windings of a stator via through channels in balancing plates. In the preceding example, additionally or optionally, the plurality of secondary passages traverse a length of the laminations stacks from a first end of the lamination stacks to a second end of the lamination stacks, each secondary passage of the plurality of secondary passages coupled to the primary coolant passage via a corresponding connecting pathway at the center of the secondary passage. In any or all of the preceding examples, additionally or optionally, flowing coolant to both ends of laminations stacks include, for each secondary passage, flowing a first portion of the coolant received from the primary coolant passage to a first balancing plate coupled to the first end of the lamination stacks and flowing a second portion of the coolant received from the primary coolant passage to a second balancing plate coupled to the second end of the lamination stacks. In any or all of the preceding examples, additionally or optionally, a direction of the flow of the first portion of coolant through a secondary passage is opposite to a direction of the flow of the second portion of coolant through the secondary passage. In any or all of the preceding examples, additionally or optionally, routing coolant to the end windings via through channels in balancing plates include spraying the first amount of coolant through a first nozzle receiving coolant from a first set of through channels in the first balancing plate to the end winding on a first end of the stator, and spraying the second amount of coolant through a second nozzle receiving coolant from a second set of through channels in the second balancing plate to the end winding on a second end of the stator. Any or all of the preceding examples, further comprising, additionally or optionally, flowing the coolant from end windings to a coolant reservoir via a pump and a coolant return line, and recirculating the coolant to the primary coolant passage via the pump and a coolant supply line.

Another example for an electric motor comprises: a rotor shaft radially enclosed within lamination stacks of a rotor, a stator including end windings at each end enclosing the lamination stacks of a rotor, a primary passage passing through a central axis of the rotor shaft from a first end of the rotor to a central region of the rotor, and two or more secondary passages passing through the lamination stacks of the rotor, each secondary passage configured to receive coolant flowing through the primary passage and flowing the coolant to two opposite ends of the lamination stacks and the end windings of the stator. In the preceding example, additionally or optionally, each secondary passage is configured to receive coolant flowing through the primary passage via a distinct connecting pathway, the two or more secondary passages parallel to each other. In any or all of the preceding examples, additionally or optionally, a first end of the each secondary passage is aligned to a through channel on a first balancing plate coupled to the lamination stacks at a first end, and wherein a second end of the each secondary passage is aligned to another through on a second balancing plate coupled to the lamination stacks at a second end, each of the through and the another through configured to supply coolant from the each secondary passage to the end windings of the stator via respective nozzles. Any or all of the preceding examples, further comprising, additionally or optionally, a first pump configured to extract coolant from the end windings of the stator to a reservoir, and a second pump configured to recirculate the coolant to the primary passage.

FIGS. 1-4 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

As used herein, an element or step recited in the singular and preceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A cooling system for an electric motor, comprising:
a primary coolant passage through a rotor shaft linked to a plurality of secondary passages through lamination stacks of a rotor configured to receive coolant at a central region of the lamination stacks; and
a balancing plate coupled to an end of the lamination stacks of the rotor, the balancing plate positioned axially adjacent to end windings of a stator, wherein the balancing plate comprises one or more through channels in fluid communication with the plurality of secondary passages.

2. The cooling system of claim 1, wherein the primary coolant passage is linked to the plurality of secondary passages via a plurality of corresponding connecting pathways at a central region of the rotor shaft with each secondary passage linked to the primary coolant passage via one corresponding connecting pathway.

3. The cooling system of claim 2, wherein the primary coolant passage along a central axis of the rotor shaft from a first end of the rotor shaft to the central region of the rotor shaft where the primary coolant passage is linked to the plurality of secondary passages, the central region substantially equidistance from the first end and a second end of the rotor shaft.

4. The cooling system of claim 3, wherein the plurality of secondary passages are arranged radially symmetrically around a central axis of the primary coolant passage and linked to the primary coolant passage via corresponding connecting pathways.

5. The cooling system of claim 4, wherein the end is a first end of the lamination stacks, and wherein the plurality of secondary passages traverse through a length of the lamination stacks from the first end of the lamination stacks to a second end of the lamination stacks.

6. The cooling system of claim 5, wherein the primary coolant passage is configured to flow coolant in a single direction from the first end of the rotor shaft to the central region of the rotor shaft, and wherein each of the plurality of secondary passages is configured to flow a first amount of coolant received from the primary coolant passage in a first direction from the central region of the of the lamination stacks to the first end of the lamination stacks and a second amount of coolant received from the primary coolant passage in a second direction from the central region of the of the lamination stacks to the second end of the lamination stacks.

7. The cooling system of claim 5, wherein the balancing plate is a first balancing plate integrally connected to the first end of the lamination stacks and the first end of the rotor shaft, and further comprising a second balancing plate integrally connected to the second end of the lamination stacks and the second end of the rotor shaft, the second balancing plate also including one or more through channels.

8. The cooling system of claim 7, wherein the one or more through passages in the first balancing plate are aligned with first ends of the plurality of secondary passages with each through channel of the one or more through channels in the first balancing plate corresponding to one of the plurality of secondary passages, the one or more through channels in the first balancing plate configured to route coolant from the first ends of the secondary passages to the end windings of the stator of the electric motor via a nozzle coupled to the first balancing plate.

9. The cooling system of claim 8, wherein the one or more through channels in the second balancing plate is aligned with second ends of the plurality of secondary passages with each through channel of the one or more through channels in the second balancing plate corresponding to one of the plurality of secondary passages, the one or more through channels in the second balancing plate configured to route coolant from the second ends of the secondary passages to the end windings of the stator of the electric motor via another nozzle coupled to the second balancing plate.

10. The cooling system of claim 8, wherein the primary coolant passage is configured to receive coolant from a reservoir via a coolant pump, the system further comprising a scavenge pump configured to return the coolant from the end windings of the stator to the reservoir for recirculation to the primary coolant passage.

11. A method for a cooling system of an electric motor, comprising:
flowing coolant from a primary coolant passage to a center of each of a plurality of secondary passages via corresponding connecting pathways;
flowing coolant to both ends of lamination stacks of a rotor via the plurality of secondary passages; and
routing coolant to end windings of a stator via through channels in balancing plates, the balancing plates including a first balancing plate coupled to a first end of the lamination stacks of the rotor, the first balancing plate positioned axially adjacent to the end windings of the stator.

12. The method of claim 11, wherein the plurality of secondary passages traverse a length of the lamination stacks from the first end of the lamination stacks to a second end of the lamination stacks, each secondary passage of the plurality of secondary passages coupled to the primary coolant passage via a corresponding connecting pathway at the center of the secondary passage.

13. The method of claim 11, wherein flowing coolant to both ends of lamination stacks include, for each secondary passage, flowing a first portion of the coolant received from the primary coolant passage to the first balancing plate coupled to the first end of the lamination stacks and flowing a second portion of the coolant received from the primary coolant passage to a second balancing plate coupled to a second end of the lamination stacks.

14. The method of claim 13, wherein a direction of the flow of the first portion of coolant through a secondary passage is opposite to a direction of the flow of the second portion of coolant through the secondary passage.

15. The method of claim 13, wherein routing coolant to the end windings via through channels in balancing plates includes spraying the first portion of coolant through a first nozzle receiving coolant from a first set of through channels in the first balancing plate to the end winding on the first end of the stator, and spraying the second portion of coolant through a second nozzle receiving coolant from a second set of through channels in a second balancing plate to the end winding on a second end of the stator.

16. The method of claim 11, further comprising, flowing the coolant from the end windings to a coolant reservoir via a pump and a coolant return line, and recirculating the coolant to the primary coolant passage via the pump and a coolant supply line.

17. A system for an electric motor, comprising:
a rotor shaft radially enclosed within lamination stacks of a rotor;
a stator including end windings at a first end and a second end of the lamination stacks, the end windings enclosing the lamination stacks of the rotor;
a first balancing plate positioned at the first end of the lamination stacks of the rotor, the first balancing plate positioned axially adjacent to the end windings at the first end;
a primary passage passing through a central axis of the rotor shaft from a first end of the rotor to a central region of the rotor; and
two or more secondary passages passing through the lamination stacks of the rotor, each secondary passage configured to receive coolant flowing through the primary passage and flowing the coolant to the first end and the second end, wherein the first end and the second end are two opposite ends of the lamination stacks, and flowing the coolant to the end windings of the stator, where the coolant flowed to the end windings at the first end of the stator are flowed through the first balancing plate.

18. The system of claim 17, wherein the each secondary passage is configured to receive coolant flowing through the primary passage via a distinct connecting pathway, the two or more secondary passages parallel to each other.

19. The system of claim 17, wherein a first end of the each secondary passage is aligned to a through channel on the first balancing plate coupled to the lamination stacks at the first end, and wherein a second end of the each secondary passage is aligned to another through channel on a second balancing plate coupled to the lamination stacks at a second end, each of the through and the another through channel configured to supply coolant from the each secondary passage to the end windings of the stator via respective nozzles.

20. The system of claim 17, further comprising a first pump configured to extract coolant from the end windings of the stator to a reservoir, and a second pump configured to recirculate the coolant to the primary passage.

\* \* \* \* \*